No. 788,388. PATENTED APR. 25, 1905.
B. F. WOODWARD.
PIPE WRENCH.
APPLICATION FILED NOV. 19, 1904.
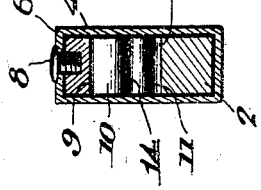
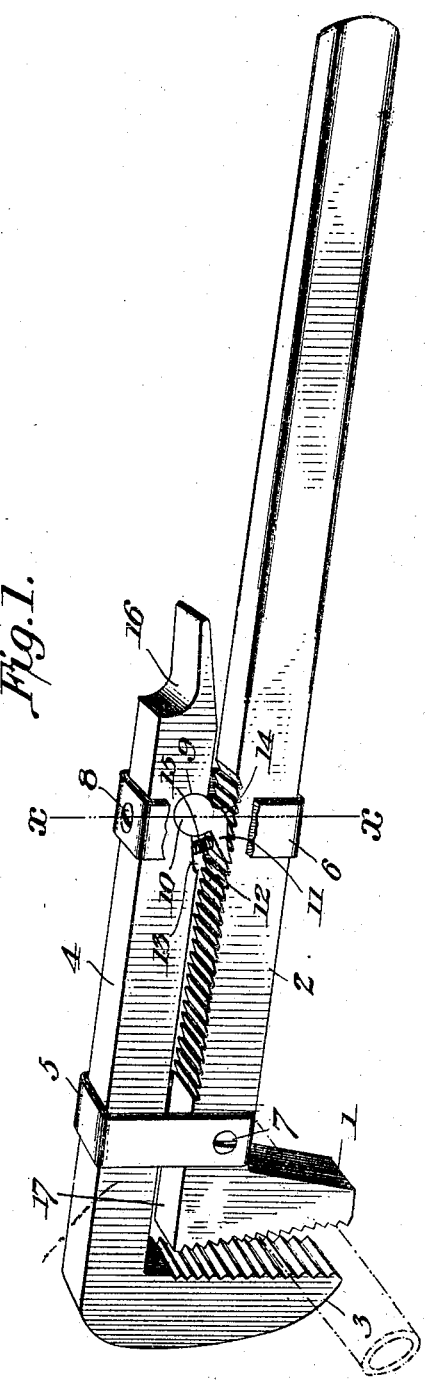
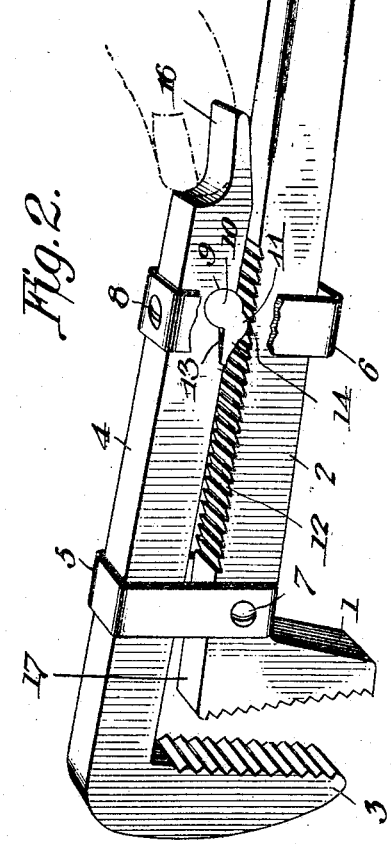
Witnesses
E. F. Stewart
Chas. J. Stoddard
Benjamin F. Woodward, Inventor.
by C. A. Snow & Co.,
Attorneys No. 788,388. Patented April 25, 1905.

UNITED STATES PATENT OFFICE.

BENJAMIN FRANKLIN WOODWARD, OF SARCOXIE, MISSOURI, ASSIGNOR OF ONE-THIRD TO HENRY B. BOYD, OF SARCOXIE, MISSOURI.

PIPE-WRENCH.

SPECIFICATION forming part of Letters Patent No. 788,388, dated April 25, 1905.

Application filed November 19, 1904. Serial No. 233,590.

*To all whom it may concern:*

Be it known that I, BENJAMIN FRANKLIN WOODWARD, a citizen of the United States, residing at Sarcoxie, in the county of Jasper and State of Missouri, have invented a new and useful Pipe-Wrench, of which the following is a specification.

This invention relates to pipe-wrenches; and one of its objects is to provide a wrench of simple and durable construction capable of being quickly adjusted to grasp the pipe or other article to be operated upon.

A further object of the invention is to provide a pipe-wrench comprising two coöperating members so constructed and relatively arranged as to avoid crushing strain upon the pipe to which the device may be applied.

The construction of the improvement will be fully described hereinafter in connection with the accompanying drawings, which form a part of this specification, and its novel features will be defined in the appended claims.

In the drawings, Figure 1 is a perspective view of a wrench embodying the invention. Fig. 2 is a similar view showing the movable jaw of the wrench depressed by the thumb of the operator preparatory to adjusting it, and Fig. 3 is a transverse section on the line *x x* of Fig. 1.

The reference-numeral 1 designates the fixed jaw of the wrench, preferably formed integral with a shank 2, the latter serving as a handle.

3 designates the movable jaw, having a shank extension 4 connected to the shank 2 of the fixed jaw by yokes 5 and 6, through which both of said shanks extend.

The forward yoke 5 is secured to the shank 2 by a transverse pin 7, and said yoke 5 is of sufficient length to permit an upward tilting movement of the shank 4 therein. The rear yoke 6 is secured to the shank 4 by a screw or like fastening device 8 passing through the upper end of the yoke and into the upper surface of the shank.

The under edge of the shank 4 is recessed to provide a rounded transverse slot 9, extending throughout the width of the shank and serving as a pivotal seat for the rounded head 10 of a dog 11, the free end of which is adapted to engage ratchet-teeth 12, formed upon the upper edge of the shank 2. Adjacent to the rounded slot 9 the under edge of the shank 4 is recessed, as shown, to provide a space 13 for the forward portion of the dog 11. The mouth of the slot 9 is sufficiently contracted to prevent the insertion of the rounded head of the dog into the said slot except from the side of the shank, and when so inserted accidental displacement of the dog is prevented by the sides of the yoke 6, as will be clear from the drawings.

The under side of the dog 11 is formed with a rounded lip 14 to serve as a fulcrum when the shank 4 is depressed and to adapt the dog to slide over the ratchet-teeth 12 without engagement therewith.

A coil-spring 15 is interposed between the upper surface of the dog and the under recessed surface of the shank 4, said spring having its ends suitably seated and serving to force the free end of the dog into engagement with the ratchet-teeth.

To adjust the wrench upon a pipe, the rear end of the shank 4 is depressed by the thumb of the operator to compress the spring 15 and throw the forward end of the dog out of engagement with the ratchet-teeth. The rear end of the shank 4 is hollowed out to form a thumb-rest 16 for this purpose. When the rear end of the shank 4 is thus depressed, its forward end and the jaw 3 are raised and the shank may then be moved longitudinally upon the lower shank 2 until the required adjustment of the toothed jaws is secured. As soon as the shank 4 is relieved of the thumb-pressure the spring 15 expands to force the dog into engagement with one of the ratchet-teeth, and thus hold the jaw 3 in its adjusted position. The handle 2 may then be manipulated to turn the pipe.

Direct crushing pressure upon the pipe will be prevented by the contact of the meeting-faces of the two shanks at the point 17, and it will be obvious that the toothed faces of the two jaws may be readily disengaged from the pipe when pressure upon the handle is released.

From the foregoing description it will be seen that an essential feature of the wrench is the fact that the rack and pawl, which are carried, respectively, by the relatively adjustable members of the wrench, are capable of bodily transverse movement toward and from each other, and the pawl is provided with a convexed rocker-face for contact with the rack when the members are moved toward each other to accomplish the disengagement of the pawl from the rack and provide for the quick adjustment of the wrench members without the necessity of using both hands in the operation. The pressure of the thumb of the hand which grasps the handle of a wrench serves to both disengage the pawl and to adjust the movable jaw to bring it in contact with the object interposed between the jaws.

It will be noted that by reason of the peculiar location and construction of the pawl the firmness with which the movable jaw is locked against displacement increases the power applied to the handle of the wrench and that the device is capable of use either as a pipe-wrench or a nut-wrench.

Having thus described the invention, what I claim is—

1. A pipe-wrench comprising a fixed jaw and shank, the latter having its upper edge provided with ratchet-teeth, a movable jaw having a shank spaced from the shank of the fixed jaw and provided on its lower edge with a recess, a spring-pressed dog pivotally supported within said recess and adapted to engage the teeth for maintaining said shanks in spaced relation to each other, and means carried by the dog and serving as a fulcrum when pressure is applied to the movable shank to disengage said dog from the ratchet-teeth on the fixed shank.

2. A pipe-wrench comprising a fixed jaw and shank, a movable jaw and shank, yokes connecting said shanks, and a spring-pressed dog pivotally supported within a recess in the edge of the movable shank, and formed with a rounded lip to serve as a fulcrum when pressure is applied to the movable shank to disengage the dog from the ratchet-teeth on the fixed shank.

3. A pipe-wrench comprising a fixed jaw and shank, the latter having its upper edge provided with ratchet-teeth, a movable jaw having a shank extension recessed on its under edge to form a rounded seat, a spring-pressed dog having a rounded head, whereby it is pivotally supported within said seat, and a yoke for connecting said shanks, the sides of said yoke serving to prevent the displacement of said dog.

4. In a pipe-wrench, the combination with a fixed jaw and shank, the latter being provided with ratchet-teeth, of a movable jaw and shank, a spring-pressed dog having a rounded head and a rounded projection below the head, the under edge of said movable shank being recessed to receive said dog, and connecting means for said shanks comprising yokes secured respectively, one to each shank, and the forward yoke being of such length as to permit a tilting movement of the movable shank therein.

In testimony that I claim the foregoing as my own I have hereto affixed my signature in the presence of two witnesses.

BENJAMIN FRANKLIN WOODWARD.

Witnesses:
S. GOODNER,
CLYDE R. WALLAR.